US011025702B2

(12) United States Patent
Levy-Abegnoli et al.

(10) Patent No.: US 11,025,702 B2
(45) Date of Patent: *Jun. 1, 2021

(54) PROPAGATING AN INTELLIGENT WALKER AGENT IN A NETWORK TO PERFORM A COMPUTATION

(71) Applicant: Cisco Technology, Inc., San Jose, CA (US)

(72) Inventors: Eric Levy-Abegnoli, Valbonne (FR); Pascal Thubert, La Colle sur Loup (FR); Patrick Wetterwald, Mouans Sartoux (FR); Jean-Philippe Vasseur, Saint Martin D'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/585,761

(22) Filed: Sep. 27, 2019

(65) Prior Publication Data

US 2020/0028888 A1 Jan. 23, 2020

Related U.S. Application Data

(63) Continuation of application No. 15/624,071, filed on Jun. 15, 2017, now Pat. No. 10,469,563, which is a (Continued)

(51) Int. Cl.
*H04L 29/08* (2006.01)
*H04L 12/721* (2013.01)
(Continued)

(52) U.S. Cl.
CPC ............ *H04L 67/04* (2013.01); *H04L 41/046* (2013.01); *H04L 43/08* (2013.01); *H04L 45/12* (2013.01);
(Continued)

(58) Field of Classification Search
CPC ....... H04L 41/046; H04L 43/08; H04L 45/12; H04L 67/04; H04L 67/12; H04L 67/34
See application file for complete search history.

(56) References Cited

U.S. PATENT DOCUMENTS 6,477,563 B1 11/2002 Kawamura
7,096,251 B2 8/2006 Chiu
(Continued)

OTHER PUBLICATIONS

Servetto et al. "Constrained Random Walks on Random Graphs: Routing Algorithms for Large Scale Wireless Sensor Networks", WSNA '02, Proceedings of the 1st ACM International Workshop on Wireless Sensor Networks and Applications, Sep. 28, 2002, 10 pages, Atlanta, GA.

(Continued)

*Primary Examiner* — Mohamed A. Wasel
(74) *Attorney, Agent, or Firm* — Behmke Innovation Group LLP; James M. Behmke; Jonathon P. Western

(57) ABSTRACT

In one embodiment, a device in a network receives a path computation agent configured to determine a path in the network that satisfies an objective function. The device executes the path computation agent to update state information regarding the network maintained by the path computation agent. The device selects a neighbor of the device in the network to execute the path computation agent based on the updated state information regarding the network. The device instructs the selected neighbor to execute the path computation agent with the updated state information regarding the network. The device unloads the path computation agent from the device after selecting the neighbor of the device to execute the path computation agent.

20 Claims, 16 Drawing Sheets

Related U.S. Application Data continuation of application No. 15/623,902, filed on Jun. 15, 2017, now Pat. No. 10,771,531.

(51) Int. Cl.

| | |
|---|---|
| *H04L 12/26* | (2006.01) |
| *H04L 12/729* | (2013.01) |
| *H04L 12/771* | (2013.01) |
| *H04L 12/24* | (2006.01) |
| *H04L 12/727* | (2013.01) |
| *H04W 4/70* | (2018.01) |

(52) U.S. Cl.
CPC .......... *H04L 45/121* (2013.01); *H04L 45/125* (2013.01); *H04L 45/44* (2013.01); *H04L 45/563* (2013.01); *H04L 41/0893* (2013.01); *H04L 67/10* (2013.01); *H04L 67/12* (2013.01); *H04W 4/70* (2018.02)

(56) References Cited

U.S. PATENT DOCUMENTS

| | | | |
|---|---|---|---|
| 7,593,376 | B2 | 9/2009 | D'Amico et al. |
| 7,834,754 | B2 | 11/2010 | Kulesz et al. |
| 9,071,535 | B2 | 6/2015 | Chattopadhyay et al. |
| 9,135,133 | B2 | 9/2015 | McAloon et al. |
| 9,311,108 | B2 | 4/2016 | Cummings |
| 2003/0140165 | A1 | 7/2003 | Chiu |
| 2004/0006589 | A1 | 1/2004 | Maconi |
| 2007/0019594 | A1 | 1/2007 | Perumal |
| 2008/0198787 | A1* | 8/2008 | Nguyen ............. H04L 1/0084 370/315 |
| 2010/0150019 | A1 | 6/2010 | Laskowski |
| 2012/0057456 | A1 | 3/2012 | Bogatin |
| 2013/0010615 | A1 | 1/2013 | Hui |
| 2013/0185235 | A1 | 7/2013 | Okamoto |
| 2014/0029445 | A1 | 1/2014 | Hui |
| 2014/0351310 | A1 | 11/2014 | Ligman |
| 2015/0235337 | A1* | 8/2015 | Petrick .................. G06F 3/1423 345/504 |
| 2016/0292303 | A1 | 10/2016 | Hong |
| 2017/0024329 | A1 | 1/2017 | Ishii |
| 2017/0034285 | A1 | 2/2017 | Bhandari |
| 2017/0208127 | A1 | 7/2017 | Kafai |
| 2017/0371829 | A1 | 12/2017 | Chen |

OTHER PUBLICATIONS

Servetto et al. "Constrained Random Walks on Random Graphs: Routing Algorithms for Large Scale Wireless Sensor Networks", EE 228A Presentation, online citation: https://pdfs.semanticscholar.org/29ec/d65e640278b058d7f9733911265ad4f9f63a.pdf, (2002) 24 pages.

Sarma et al. "Distributed Random Walks" Journal of the ACM, vol. 1, No. 1, Article 1, Publication date: Jan. 1; pp. 1-31.

Brian Butte "Serverless computing: How did we get here? (Part 1)" Dancing in the Cloud; IDG Contributor Network; Feb 1, 2016; pp. 1-4.

Brian Butte "Serverless computing: Mapping out the possibilities (Part 2)" Dancing in the Cloud; IDG Contributor Network; Feb. 17, 2016; pp. 1-4.

David Messina "Docker Announces Orchestration for Multi-Container Distributed Apps" https://blog.docker.com/2014/12/docker-announces-orchestration-for-multi-container-distributed-apps/; Docker Blog; Dec. 4, 2014; pp. 1-10.

Victoria Gosalvez "Managing and Monitoring Devices Using RoboMQ Device Manager" https://dzone.com/articles/managing-and-monitoring-devices-using-mission-cont; Aug. 23, 2016.

* cited by examiner

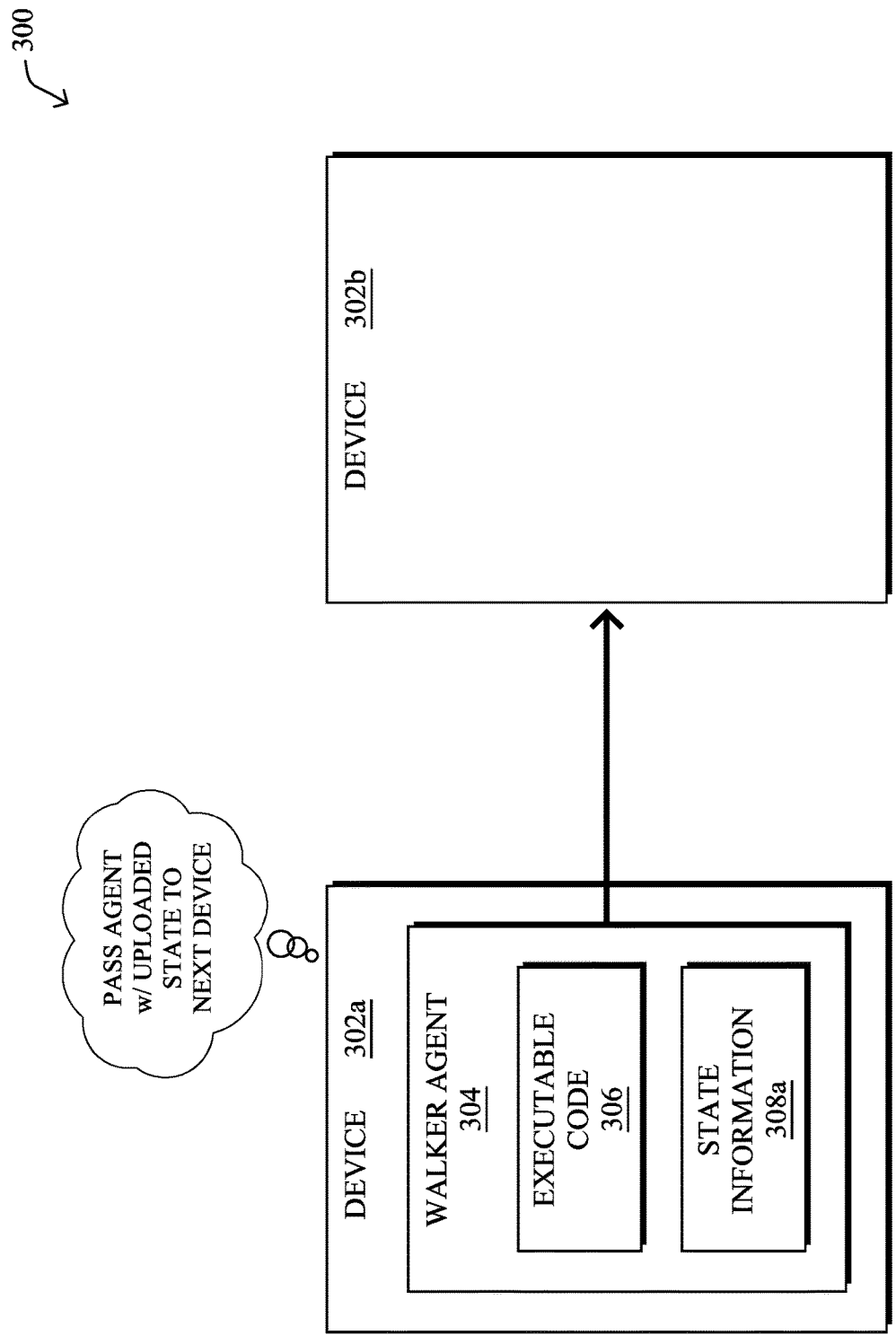

PROPAGATING AN INTELLIGENT WALKER AGENT IN A NETWORK TO PERFORM A COMPUTATION

RELATED APPLICATION

This application is a continuation of U.S. patent application Ser. No. 15/324,071, filed on Jun. 15, 2017, entitled PROPAGATING AN INTELLIGENT WALKER AGENT IN A NETWORK TO PERFORM A COMPUTATION, by Levy-Abegnoli, et al., which is a continuation of U.S. patent application Ser. No. 15/623,902, filed on Jun. 15, 2017, entitled INTELLIGENT WALKER AGENTS IN A NETWORK, by Levy-Abegnoli, et al., the contents each of which are incorporated herein by reference.

TECHNICAL FIELD

The present disclosure relates generally to computer networks, and, more particularly, to intelligent walker agents in a network.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

An example implementation of an LLN is the "Internet of Things" (IoT), which may be used by those in the art to refer to uniquely identifiable objects/things and their virtual representations in a network-based architecture. In particular, the IoT involves the ability to connect more than just computers and communications devices, but rather the ability to connect "objects" in general, such as lights, appliances, vehicles, window shades and blinds, doors, locks, etc.

Many traditional computing approaches are not applicable to LLNs and the IoT. For example, to optimize a metric along a path using a traditional routing approach, the prerequisite is that the topology and the relevant metric are known by the device performing the computation. However, the limitations of many LLN devices in terms of memory capacity, duty cycle, etc., often make such computations impossible.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3D illustrate examples of a walker agent being passed from one device/node to another in a network.

DESCRIPTION OF EXAMPLE EMBODIMENTS

Overview

Figure 1:
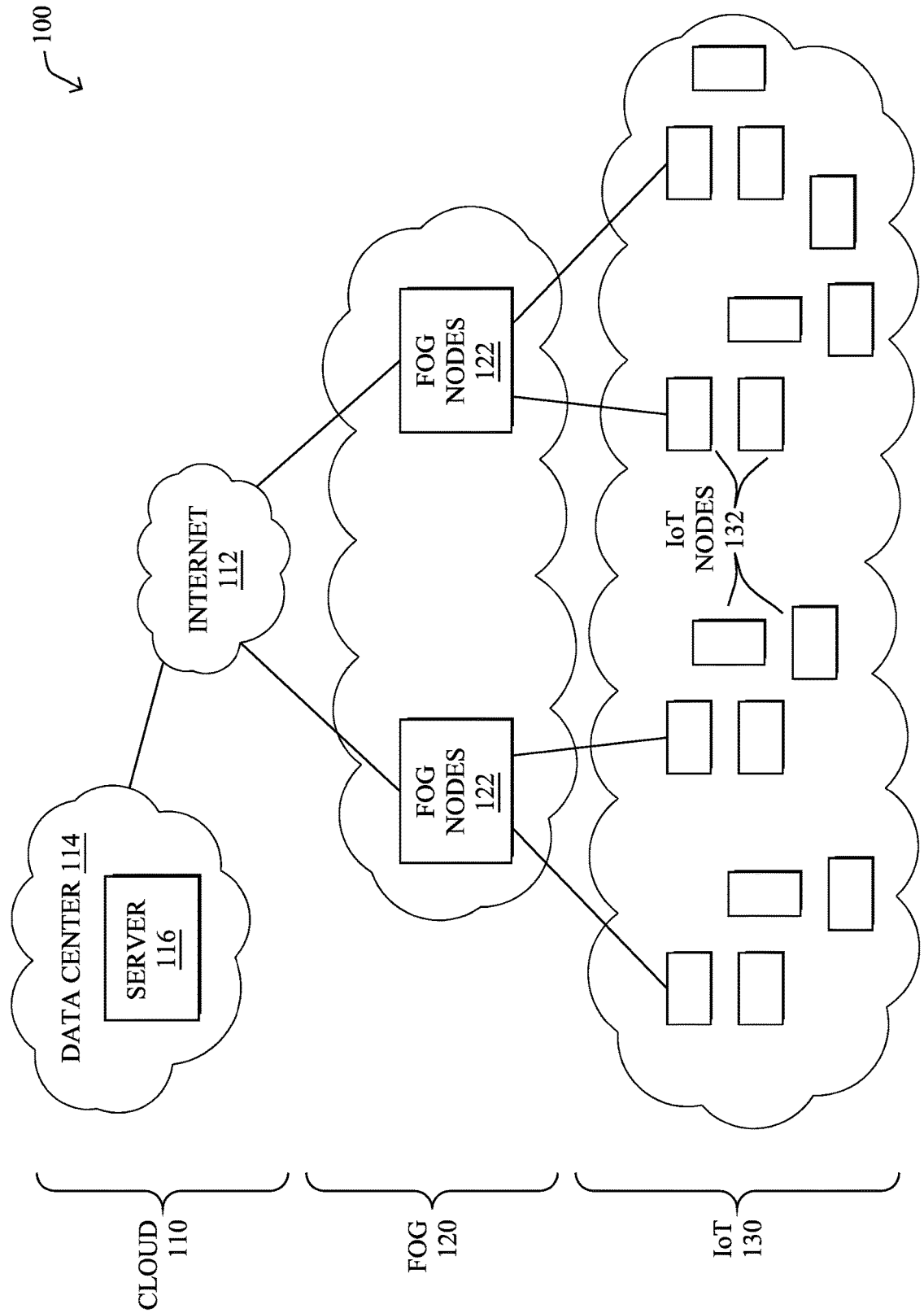
FIG. 1 illustrate an example communication network.

According to one or more embodiments of the disclosure, a device in a network receives a path computation agent configured to determine a path in the network that satisfies an objective function. The device executes the path computation agent to update state information regarding the network maintained by the path computation agent. The device selects a neighbor of the device in the network to execute the path computation agent based on the updated state information regarding the network. The device instructs the selected neighbor to execute the path computation agent with the updated state information regarding the network. The device unloads the path computation agent from the device after selecting the neighbor of the device to execute the path computation agent.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity.

Also, those skilled in the art will further understand that while the network is shown in a certain orientation, the network 100 is merely an example illustration that is not meant to limit the disclosure.

Figure 2:
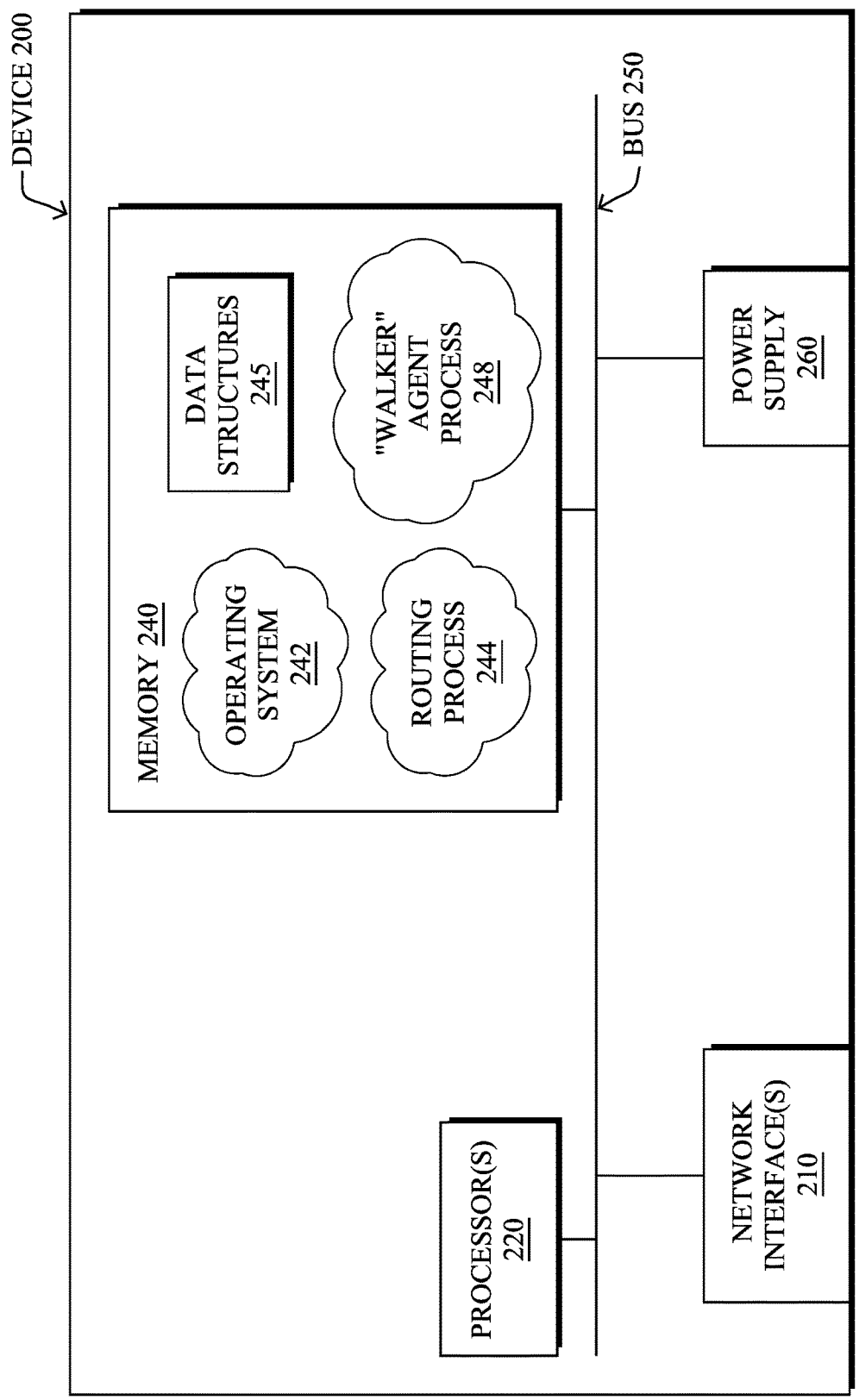
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative "walker" agent process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 include computer executable instructions executed by processor 220 to perform functions provided by one or more routing protocols, such as an Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

Another example protocol that routing process 244 may implement, particularly in the case of LLN mesh networks, is the Routing Protocol for Low Power and Lossy (RPL), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Intelligent Walker Agents in a Network

As noted above, many devices/nodes in constrained networks, such as LLNs and the IoT, have very limited resources in terms of available memory, processing power, power source (e.g., battery charge, etc.), and the like. Accordingly, such devices may not be able to locally perform many computationally-intensive tasks. This is particularly true in cases in which the processing device/node is required to maintain state information for multiple devices/nodes in the network.

To address the various limitations of constrained devices in certain networks, existing approaches rely on the deployed devices leveraging a more capable device to perform the computations. For example, the devices in the network could offload the computations to a remote server or cloud-based service outside of the local network. However, doing so also increases the amount of bandwidth consumed to relay the information to and from such a server or service (e.g., via a WAN connection). A more recent evolution proposes the use of the local networking devices, such as edge routers, to perform the computations in the "fog."

According to various embodiments, the concept of a "walker agent" is introduced herein and offers yet another alternative approach to performing more complex computations in a network of constrained devices/nodes. In general, a walker agent refers to a software agent that loads and executes on a particular device/node in a network, updates state information for its computation during execution, passes both its executable code and updated state information to the next device/node in the network for execution, and then unloads/removes its local copy of the agent. In other words, execution of a walker agent "hops" from one device in the network to the next, while maintaining the state information for its computations during these transfers.

FIGS. 3A-3D illustrate examples of a walker agent being passed from one device/node to another in a network. As shown, consider the case of two devices, device 302a and device 302b, both located in a network 300. In some cases, devices 302a-302b may be neighboring devices having a direct communication link there between. In other cases, devices 302a-302b may be separated by any number of intermediate devices that relay communications between devices 302a-302b.

During operation, device 302a may receive walker agent 304 from another device in the network, such as a neighbor of device 302a, another constrained device along a routing path in the network, or from a supervisory device that provides administrative control over device 302a. In various embodiments, walker agent 304 may comprise executable code 306, as well as state information 308.

Figure 3A:
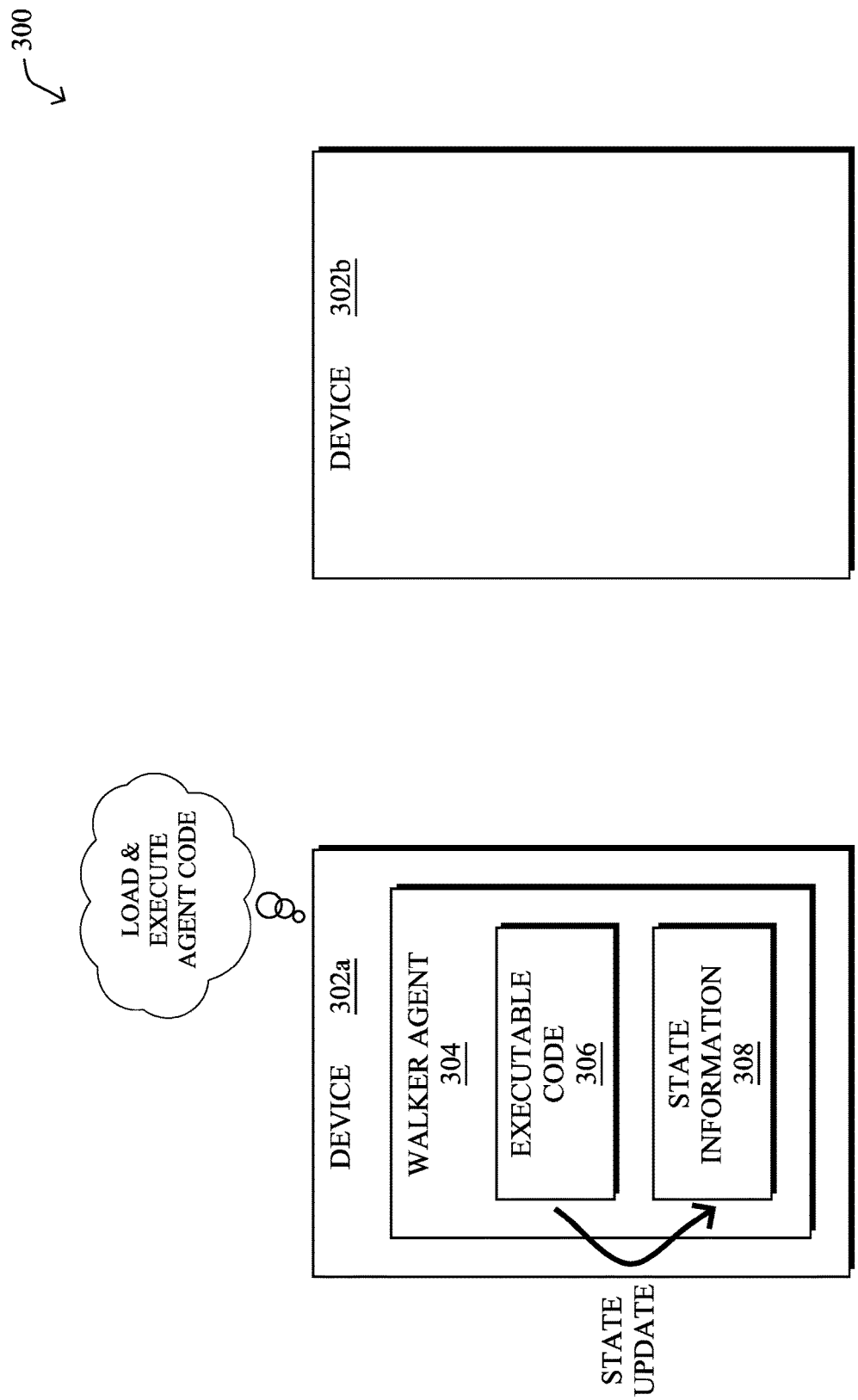

As shown in FIG. 3A, device 302a may load executable code 306 which performs a particular computation for which it was configured and updates state information 308, accordingly. Generally, state information 308 may be a set of one or more parameter values that reflect the current state of the computation performed by executable code 306. Such values may be one or more observations about device 302a (e.g., the neighbors of device 302a, the signal strengths to the neighbors, etc.), the portion of network 300 around device 302a, and/or computed values derived therefrom (e.g., averages, statistics, maxima or minima, gradients, etc.).

For example, assume that executable code 306 is configured to calculate an optimal value or running total at each hop or at specific points along a networking path, based on the locally observable value(s) at each device. In such a case, when device 302a receives walker agent 304, it may load and execute executable code 306 of walker agent 304, to retrieve its own locally observable value(s), perform the associated computations on them, and update state information 308, accordingly.

Figure 3C:
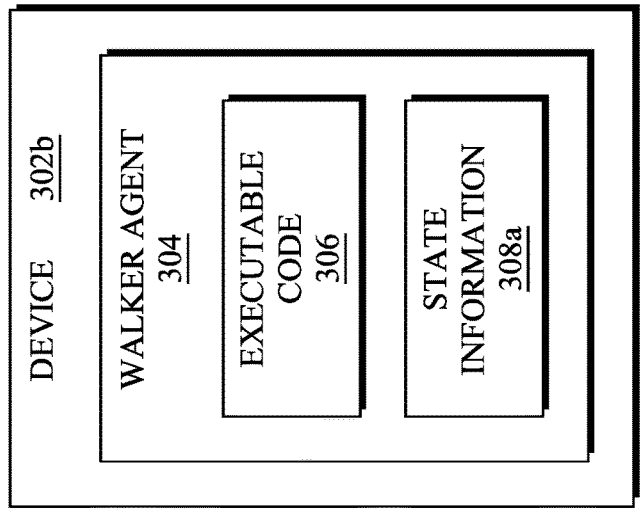
Figure 3C:
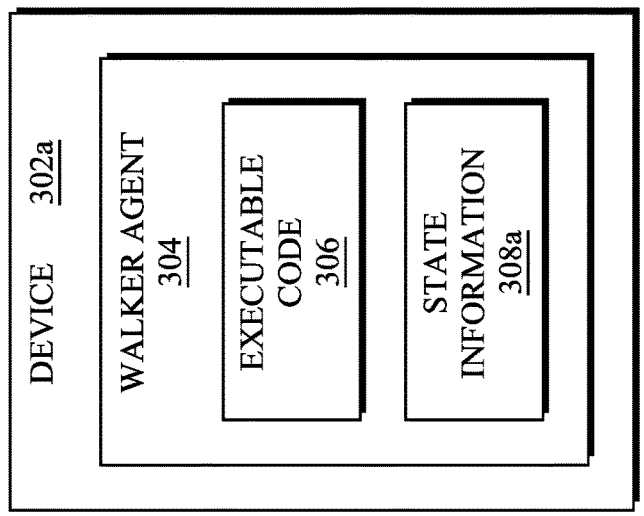

As shown in FIGS. 3B-3C, once device 302a has executed walker agent 304, thereby updating state information 308 into updated state information 308a, device 302a may send walker agent 304 to device 302b. In doing so, when device 302b executes code 306 of walker agent 304, walker agent 304 is able to continue its computation from the point at which it left off on device 302a. In other words, device 302b may then load walker agent 304 and update state information 308a using its own local information. Once completed, device 302b may then send walker agent 304 on to the next device in the network, to repeat the process.

Figure 3D:
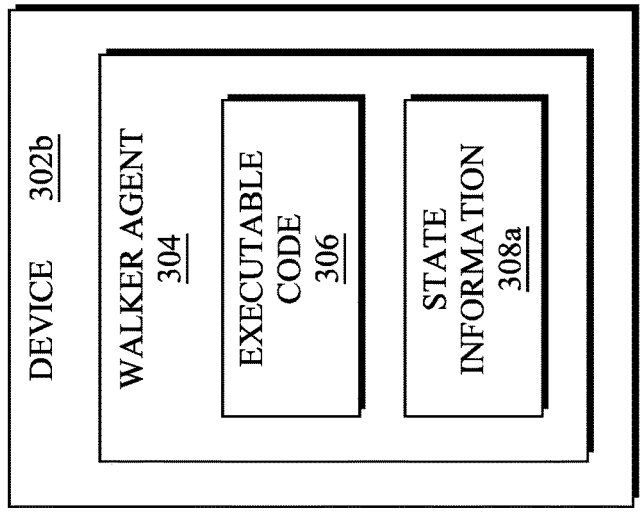
Figure 3D:

In FIG. 3D, another key aspect of a walker agent is that its execution may "hop" from device to device in the network, in various embodiments. Notably, after walker agent 304 has been passed to device 302b, device 302a may unload walker agent 304 from its local system, thereby freeing up resources on device 302a. In some embodiments, this may entail deleting or otherwise removing walker agent 304 from 302a after walker agent 304 has been passed to device 302b for execution. In other words, at any given time, a walker agent may be executed by a subset of one or more devices in the network that changes over the course of time as the executing device(s) complete their computations.

Various use cases for a walker agent are described below as examples of computations that could not otherwise be performed by constrained devices in a network. As would be appreciated, these examples are provided for illustrative purposes only and are not intended to be limiting.

Path Computation in a Network Using a Topology Walker

In many traditional routing protocols, when an objective function for one or more metrics needs to be satisfied/optimized for a routing path, a prerequisite is that the node performing the path computation already knows the topology of the network and the relevant metric(s). For example, the node performing the path computation may seek to find a network path that minimizes the number of hops, or satisfies a predefined threshold in terms of delay, jitter, or bandwidth along the path. Any number of other objective functions can also be used for purposes of path selection.

To perform the path computations using many existing protocols, two different approaches are typically taken. In one approach, the entire set of information (e.g., topology information, observed metrics, etc.) may be flooded throughout the network, to disseminate the information through the graph of nodes. For example, if the computed result is to be used for forwarding, such as via the shortest network path, each node individually computes the optimal path for the metric, and repeat that operation regularly. In the alternate approach, the information is made available to a path root, which can perform source routing for the optimized metric.

When attempting to implement existing network protocols in an LLN, such as an IoT network, both the required local computations and transfer of information between nodes may be too cumbersome for the constrained devices/nodes in the network. For example, a set of temperature sensors may not have the storage capacity to store large amounts of network state needed to perform path computations and/or to send state information to a central path computation engine (PCE). Notably, many devices in an LLN or IoT network are characterized by having low processing and storage capabilities, limited bandwidth, constrained duty cycles and power sources (e.g., many are battery powered), and the like.

The techniques herein introduce a software agent module that can physically "walk" within a network, to compute a path that satisfies an objective function (e.g., in terms of number of hops, jitter, delays, battery, temperature, etc.). In doing so, the metric and topology information does not need to be propagated throughout the network or maintained by a sole device in the network. This allows many constrained nodes, such as LLN/IoT nodes, to still contribute to the path computation.

Specifically, according to one or more embodiments of the disclosure as described in detail below, a device in a network receives a path computation agent configured to determine a path in the network that satisfies an objective function. The device executes the path computation agent to update state information regarding the network maintained by the path computation agent. The device selects a neighbor of the device in the network to execute the path computation agent based on the updated state information regarding the network. The device instructs the selected neighbor to execute the path computation agent with the updated state information regarding the network. The device unloads the path computation agent from the device after selecting the neighbor of the device to execute the path computation agent.

Illustratively, the techniques described herein may be performed by hardware, software, and/or firmware, such as in accordance with the "walker" agent process 248, which may include computer executable instructions executed by the processor 220 (or independent processor of interfaces 210) to perform functions relating to the techniques described herein, e.g., in conjunction with routing process 244.

Operationally, the proposed techniques sharply change the paradigm with respect to path computations. In various embodiments, instead of each node sending its information to the point of computation, such as to each node, to the network root, to a PCE, etc., a software-based, path computation "walker" agent may traverse the topology of the network to perform the path computation. In general, as referred to herein, a "walker" agent refers to a signed piece of software that can be executed securely when it is installed in a given device/node, together with whatever state it carries at the time of execution, and that can copy or transfer itself to an adjacent/neighboring node, together with its state. For example, in the case of a path computation agent, each node that executes the agent may attempt to optimize the objective function and update the state maintained by the agent regarding the network, before having the agent "walk" to a selected neighbor of the node for execution. In particular, instead of exploring the topology graph for the network at the executing node, which requires the topology and metrics to be known by the node, the agent explores the topology graph by physically moving its execution from node to node within the network itself, which only requires each executing node to know its neighbors.

Any number of different approaches can be used to have the path computation agent physically moves its execution from node to node within the network (e.g., Dijkstra's, Bellman-Ford, etc.). Because of this movement of the execution of the agent between the various members of the network, it may also entail the agent backtracking occasionally, such as when a path segment is found non-optimal for the metric. Notably, when the path computation agent reaches a node, and is loaded and executed by that node, the agent may use its maintained state regarding the network (e.g., accumulated path metrics, etc.) to determine that the latest accumulated metric is sub-optimal compared to the current best one. In such a case, the node may pass execution of the agent back to its neighbor from which it was received and/or try another neighbor, instead. The agent can, in various cases, keep a state of which neighbors have been explored or, alternatively, store that state in the node itself.

Figure 4A:
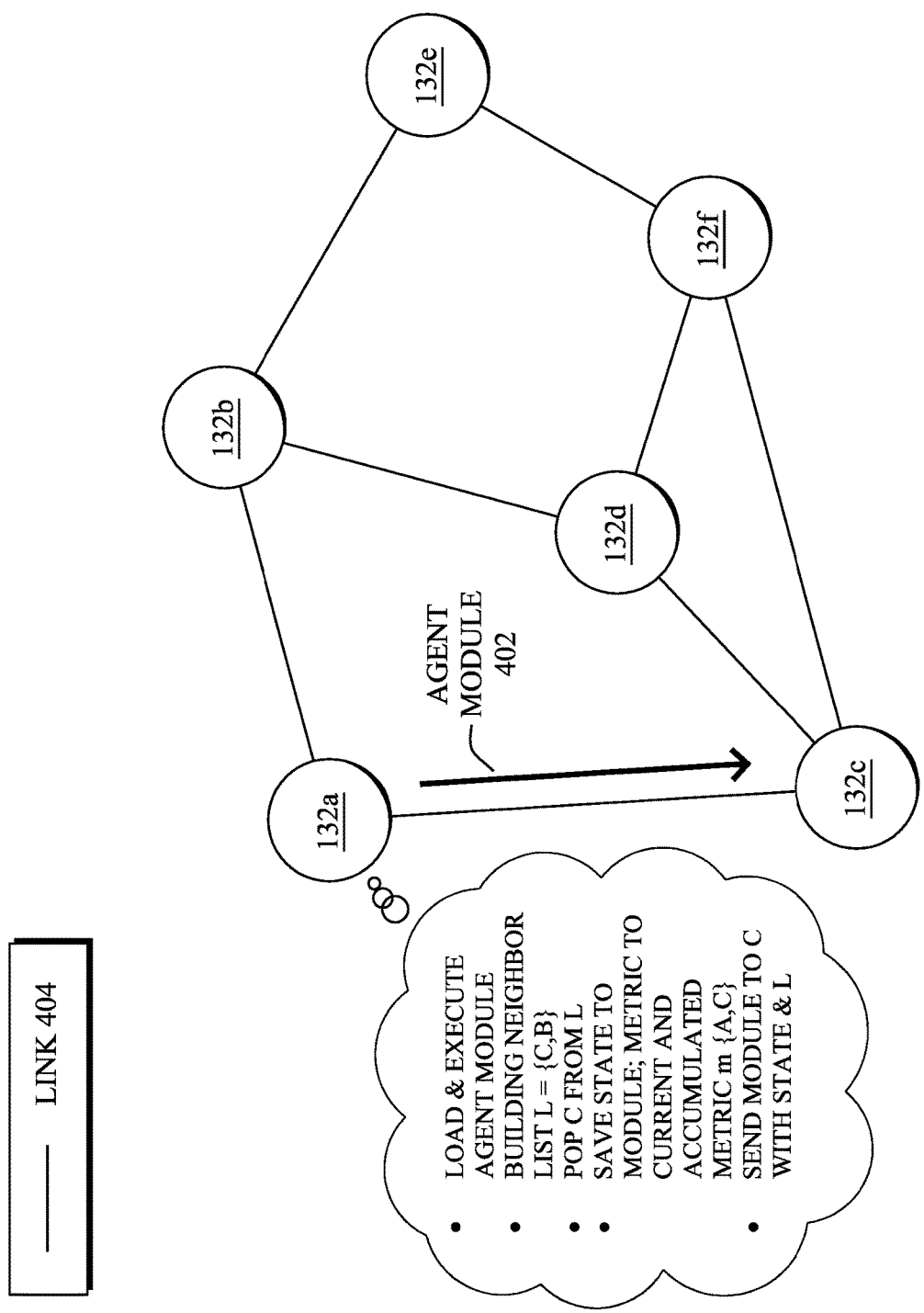
FIGS. 4A-4E illustrate an example of propagating a path computation agent within a network.

FIGS. 4A-4E illustrate an example of propagating a path computation agent within a network, according to various embodiments. As shown in FIG. 4A, assume that there are nodes/devices 132a-132f within network portion 400 (e.g., a portion of network 100) that are interconnected by links 404. In various embodiments, a path computation agent may "walk" the nodes 132a-132f, in order to identify a path in network segment 400 that optimizes a defined objective function (e.g., optimizes one or more network metrics). As noted above, "walking" herein generally refers to the repetitive process of unloading the agent after execution on a given node and loading the agent on a neighbor of the node for execution.

In FIG. 4A, assume that node 132a is the first node 132 in network portion 400 to execute the path computation agent. Thus, the agent at this point in time has no state information regarding network portion 400. Node 132a may load the agent module either directly or in a virtualized manner, such as in a container (e.g., Docker container, etc.) or in a virtual machine (VM). Such a module may include the executable agent itself and/or the state information for the executing agent (e.g., information gathered by the agent regarding the network). In some embodiments, node 132a may receive the agent for execution from another node or a supervisory device. In other embodiments, the agent may be preexisting on node 132a and remain dormant and unloaded until execution time.

Once loaded by node 132a, the path computation agent may build a neighbor list L of the nodes that neighbor node 132a as part of its state information regarding the network. In other words, the agent may first identify the neighbors of node 132a, nodes 132b and 132c, for inclusion in the list. Neighbor discovery can be achieved using any of the various wireless and neighbor discovery protocols available.

From the identified neighbors list, the path computation agent may assess the metrics associated with the neighbors of node 132a, such as metrics regarding their respective links 404. To then explore further into the topology of network portion 400, the agent may select one of the neighbors, such as 132c shown, to next execute the path computation agent. For example, the agent may pop node 'C' (e.g., node 132c) from the neighbor list and save the current and accumulated metrics as part of the state maintained by the agent. In turn, node 132a may send the agent module 402 on to node 132c that includes the state information maintained by the path computation agent, such as the current neighbor list (e.g., topology information) and metrics (e.g., current and accumulated). In other words, node 132a may instruct its neighboring node 132c to load and execute the path computation agent and using the information in module 402. After selecting the neighbor node 132c to next load and execute the agent (e.g., before or after instructing node 132c to next load and execute the agent), node 132a may unload the agent from itself, thereby again freeing resources on node 132a.

Figure 4B:
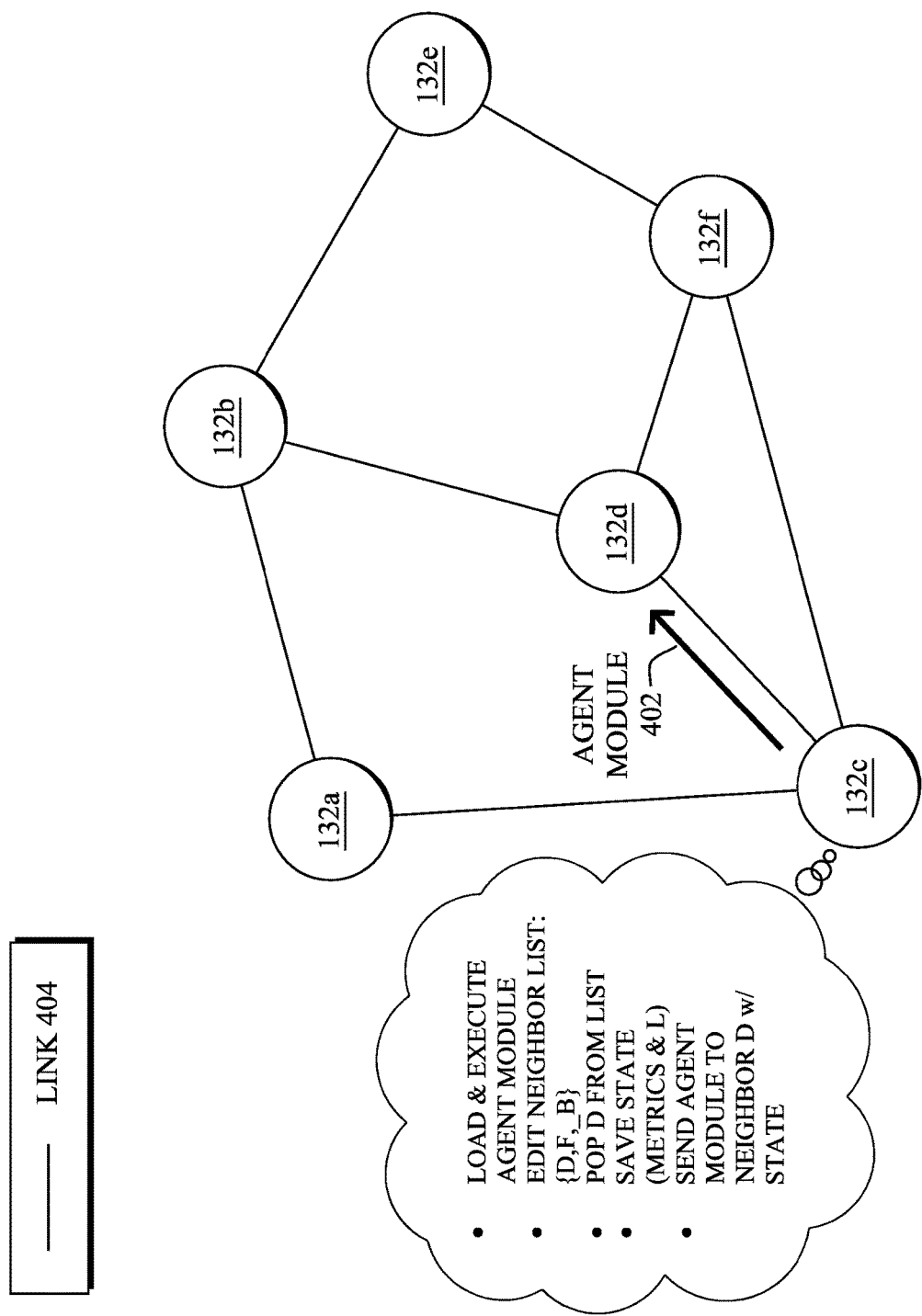

In FIG. 4B, node 132c load and execute the path computation agent using the state information received from node 132a. In turn, the agent executing on node 132c may identify the neighbors of node 132c, nodes 132d and 132f, update the neighbor list maintained by the agent, and assess their respective metrics. In particular, the agent may assess these metrics in view of the metrics sent by node 132a as part of module 402, to see whether exploration of either neighbor represents an optimal next step or, alternatively, whether execution of the agent should backtrack to node 132a (e.g., for exploration of node 132b instead).

Assume, for purposes of illustration, that the agent executing on node 132c determines that node 132d should next be explored. Accordingly, the agent may pop node 'D' (e.g., node 132d) from its neighbor list, and send agent module 402 with the updated state information to node 132d, thereby instructing node 132d to load and execute the agent. In turn, node 132c may unload its copy of the agent.

Figure 4C:
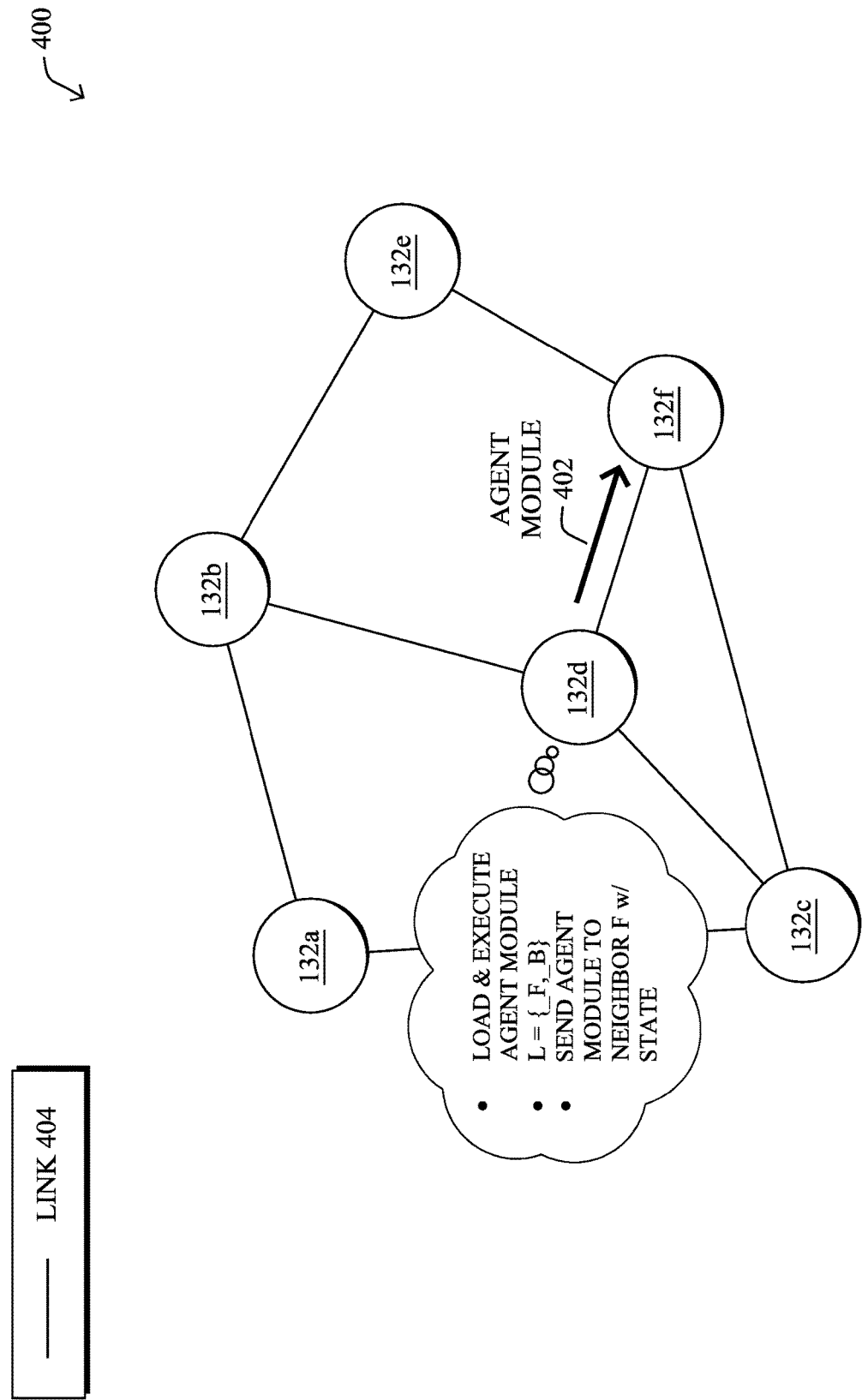

In FIG. 4C, node 132d may then operate in a similar manner as that of node 132c, loading and executing the agent with the state information received from node 132c. Notably, node 132d may identify its neighbor(s), update the neighbor list of the agent, and assess the metrics in view of the objective function. If the agent determines that exploring node 132f is the next optimal step, node 132d may send the agent module 402 with the updated state/topology information to node 132f, thereby instructing node 132f to load and execute the agent locally using the received information. In turn, node 132d may unload its copy of the agent, to free up resources.

Figure 4D:
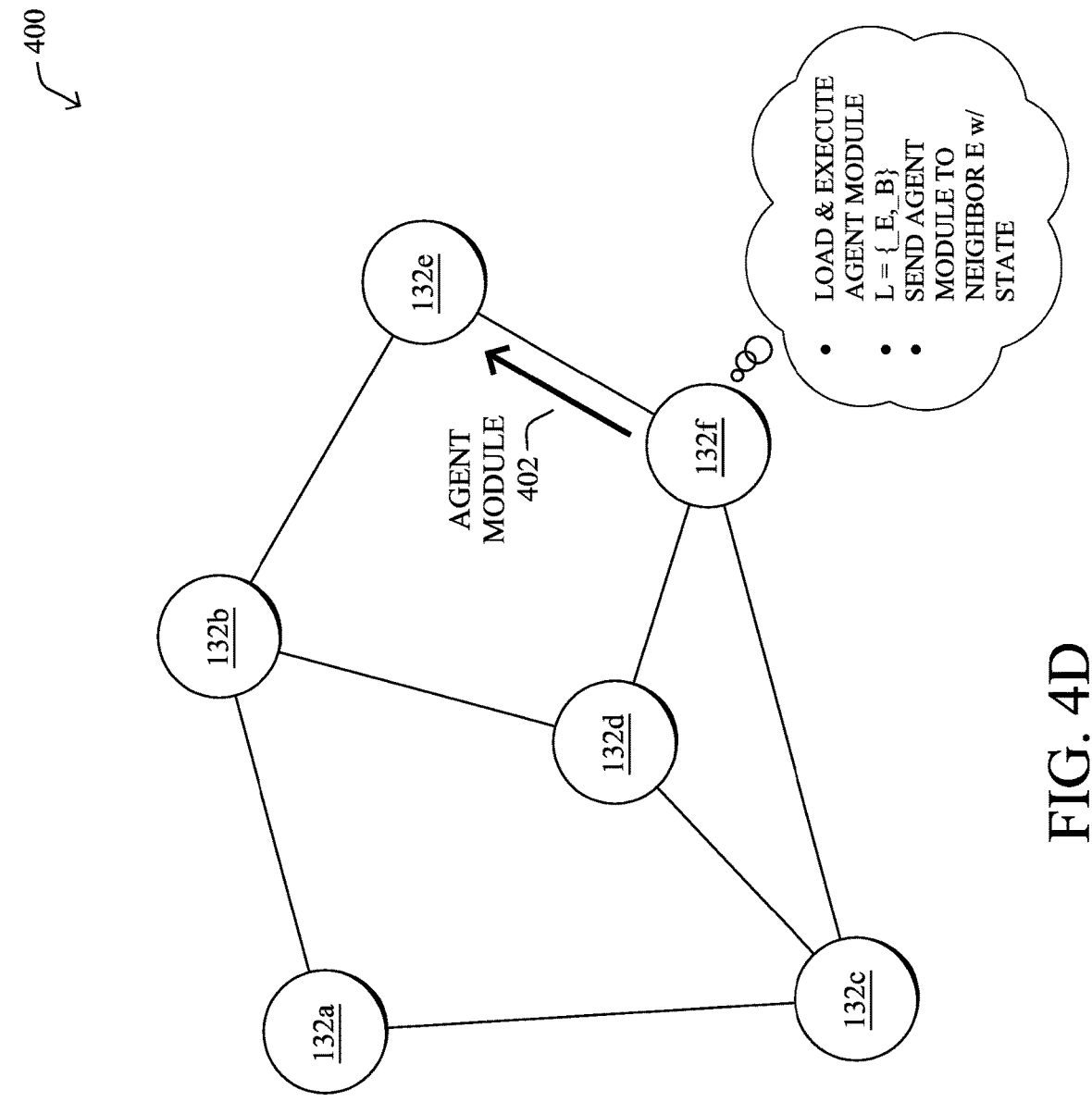

In FIG. 4D, node 132f may load and execute the agent with the received information from node 132d. In turn, node 132f may identify its own neighbors, update the state information, and determine that node 132e is the next optimal hop to explore in view of the metrics observed thus far by the walking agent. If so, node 132f may send module 402 on to node 132e with the updated state information for loading and execution by node 132e. To complete the "walking" action, node 132f may also unload the agent from itself, to free up its own resources.

Figure 4E:
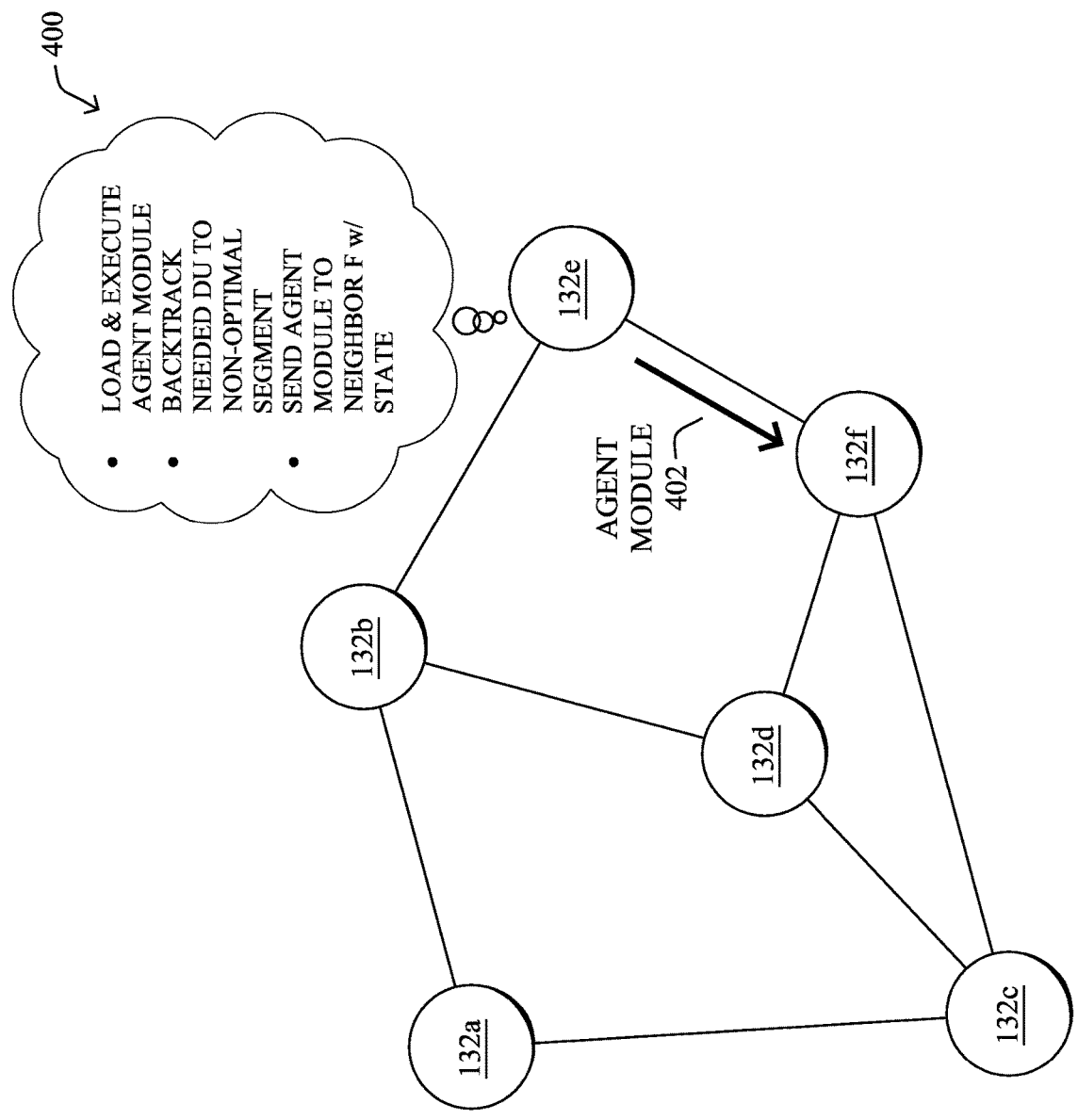

In FIG. 4E, assume now that the path computation agent loaded and executed by node 132e explores the neighbors of node 132e and determines that the metrics associated with traversing the link 404 to node 132b would be sub-optimal in view of the metrics for the explored segments thus far. In such a case, node 132e may determine that the agent should backtrack to node 132f. Thus, node 132e may send the agent module 402 with its updated information back to node 132f, from which node 132e received module 402, thereby instructing node 132f to again load and execute the agent. Node 132e may also unload its executing copy of the agent, returning execution of the agent to node 132f.

As the agent makes its way through network portion 400, each node may mark the path, so that the node knows where to forward network traffic received by the node. In various embodiments, the path computation agent may regularly walk through the nodes of network portion 400, such as when a change in the network is detected. For example, when a node determines that a link cost has changed significantly (e.g., by a certain percentage, a predefined delta, etc.), the node may again load and execute the path computation agent, to walk the local disturbance and re-compute the affected paths. In various cases, the agent may remain dormant/unloaded on the node or, alternatively, the node may again request the path computation agent, when a change in the network is detected.

Note that by propagating the path computation agent from node to node within the network, the topology does not need to be distributed throughout the network, which may be very resource-consuming for large topologies. Further, no node in the network need store the entire topology. In an LLN or IoT network (e.g., a sensor network), with a very large number of nodes, storing the topology may require more memory than available on the nodes.

In further embodiments, the agent may replicate itself to explore branches of the topology in parallel, thereby speeding up the overall path computation. When replicating, the two (or more) agents may agree to meet at a rendezvous point in the network (e.g., a selected node), which will then merge the information from the agents (e.g., by merging their maintained state information). For example, when a replica visits a node that was already visited by one of its clones, it may compare the cost that the clone found for the path to that node and if the previous cost was better or for a newer iteration (e.g., as indexed by a sequence number and the ID of the node that started the computation when it found the disturbance and/or the time when the disturbance was found) then this replica dies there (e.g., unloads/exits). If the replica brings in a better cost, it overrides the previous state.

Said differently, the techniques herein introduce a "walking agent" that does not run on one CPU, and does not require full knowledge of the network topology, to make path computations. Instead, the agent moves itself (physically) from one node to the next, carrying previously computed states, to execute some logic on each node, which depends on already computed states and the local situation. All that is required for a node is to know its immediate neighbor, but never needs to sends this information. When the agent leaves a node for the next, it marks the route and a few other states. When the agent is done walking the network (circulating on it), the situation on each node is the very same as if each node had the full topology and ran the same path computation from a global perspective.

Figure 5:
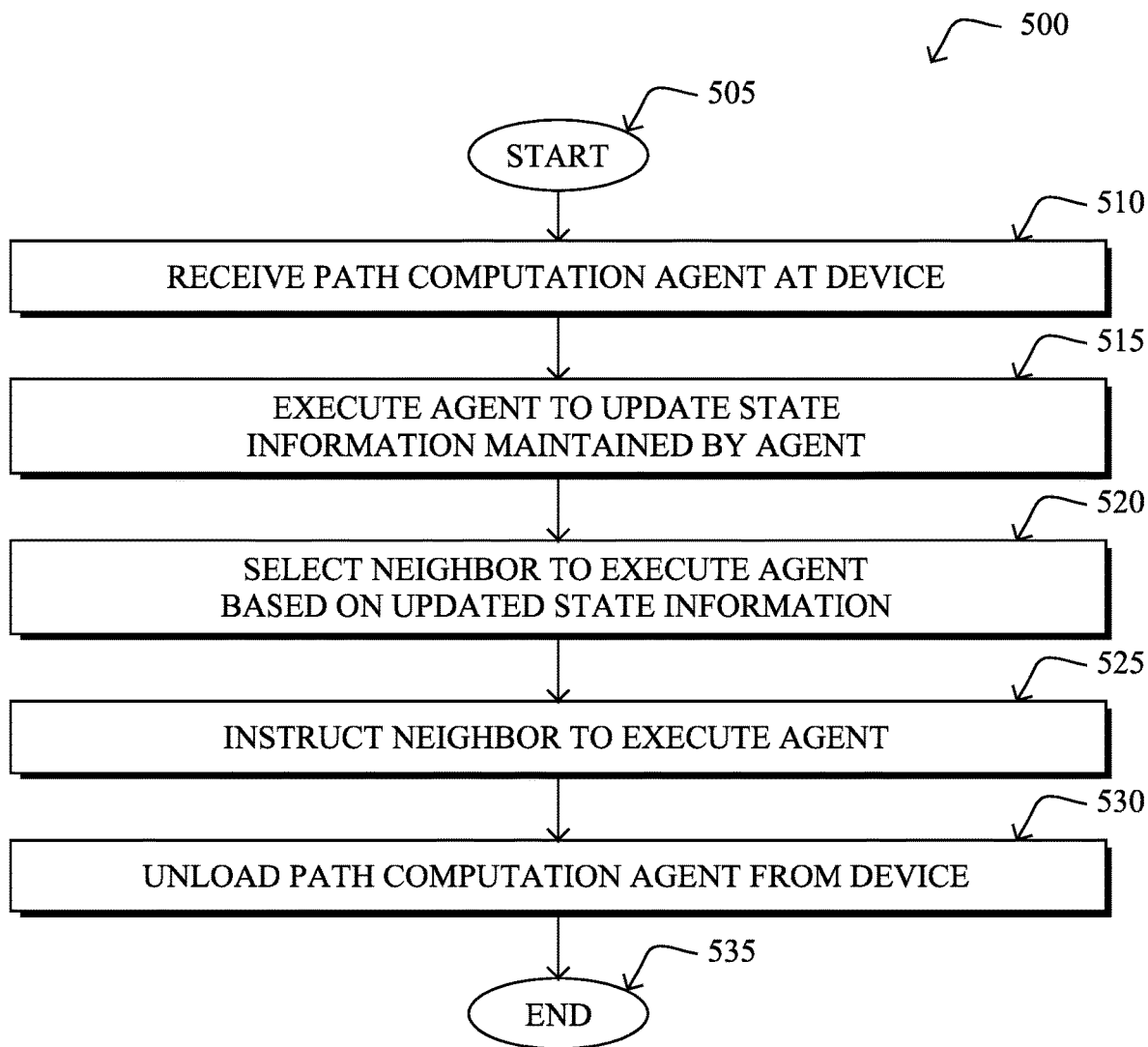
FIG. 5 illustrates an example simplified procedure for using a topology walker agent to perform path computations in a network.

FIG. 5 illustrates an example simplified procedure for using a topology walker agent to perform path computations in a network, in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, the device may receive a path computation agent configured to determine a path in the network that satisfies an objective function. The objective function may, for example, attempt to optimize one or more metrics for a network path, such as the number of hops, delay, jitter, hop resources (e.g., in terms of CPU, memory, battery, etc.), combinations thereof, or the like. In general, the path computation agent may be a "walker" agent that gets executed by different nodes at different times, thereby allowing the agent to walk from one node/device to another by switching its executing device. In some cases, the device may also receive state information regarding the network from another device/node that previously executed the agent.

At step 515, as detailed above, the device may execute the path computation agent to update state information regarding the network maintained by the path computation agent. For example, the executing agent may identify any neighbors of the device, determine any metrics associated with the links thereto, calculate aggregated metrics, and/or compare the updated metrics to those received by the device. If, for example, the device determines that a given link to its neighbor would have an aggregated metric that is worse than the current aggregated metric, the device may determine that the agent should backtrack to the neighbor from which the device received the agent.

At step 520, the device may select a neighbor to execute the path computation agent based on the updated state information, as described in greater detail above. Notably, if the link to one of the neighbors of the device offers a currently-optimal path in view of the objective function, the node may select that neighbor as the next node for the path computation to explore.

At step 525, as detailed above, the device may instruct the selected neighbor to execute the path computation agent using the updated state information regarding the network (e.g., as updated by the device). For example, in some cases, the instruction may include the state information (e.g., the metrics and topology information thus far obtained by the walking agent) and/or the code for the agent itself. Such an instruction may cause the receiving neighbor to load and execute the path computation agent using the state information sent by the device, thus "walking" the agent to the neighbor for further execution.

At step 530, the device may unload the path computation agent from the device after selecting the neighbor of the device to execute the path computation agent, as described in greater detail above. In some cases, the device may unload the agent after its state information is updated. In other cases, the device may wait for successful transmission of the instruction to the neighbor to begin executing the agent, before unloading the local copy of the agent. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Propagating an Intelligent Walker Agent to Perform a Computation

Another potential use case for walker agents addresses cases in which a device/node in the network is unable to perform a certain computation locally. As noted above, LLNs exhibit a number of different constraints that are not typically found in traditional networks, such as very limited node resources in terms of CPU, power source (e.g., battery or scavenged), and the like. In some cases, resources on a node may be so constrained that the node cannot complete the required computation, such as computing a network path, locating itself with GPS, signing or verifying a piece of data, etc. One potential way to address this is to perform the node's computations on a supervisory device, such as a PCE. However, this is only applicable in situations in which the data is not overly time-sensitive. For example, in the case of an instantaneous temperature, or the like, the data returned back to the node may already be outdated for use.

In further embodiments of the techniques herein, a node may leverage a walking agent to offload certain computations, such as the path computations described previously. In particular, the walking agent may traverse the network until it finds a node that can execute the agent or, in some cases, split the agent into smaller agents and either run them or spread them again.

Illustratively, the techniques described herein may be performed by hardware, software, and/or firmware, such as in accordance with the "walker" agent process 248, which may include computer executable instructions executed by the processor 220 (or independent processor of interfaces 210) to perform functions relating to the techniques described herein, e.g., in conjunction with routing process 244.

Figure 6A:
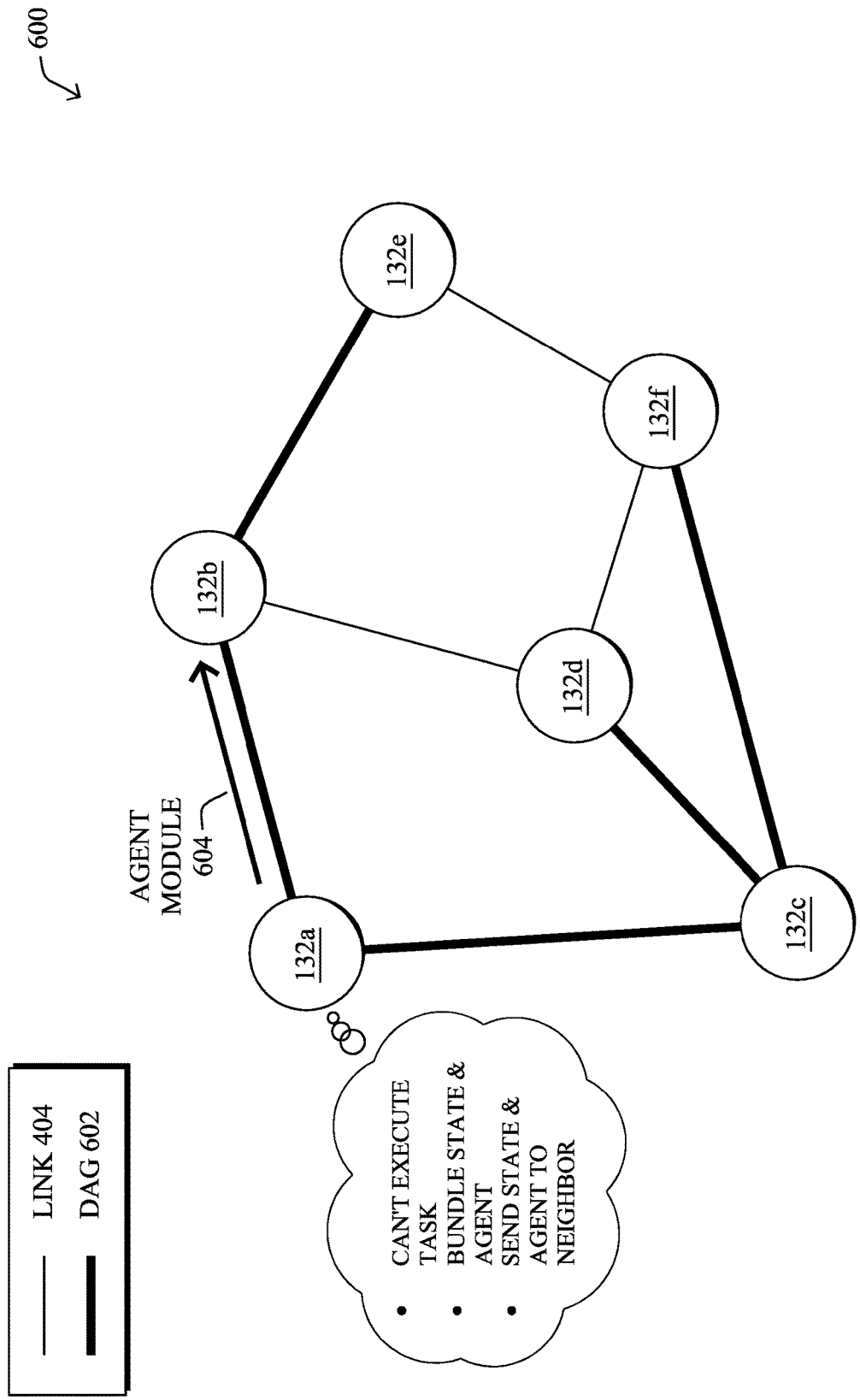
FIGS. 6A-6C illustrate an example of sending an agent to another network node for execution.
Figure 6B:
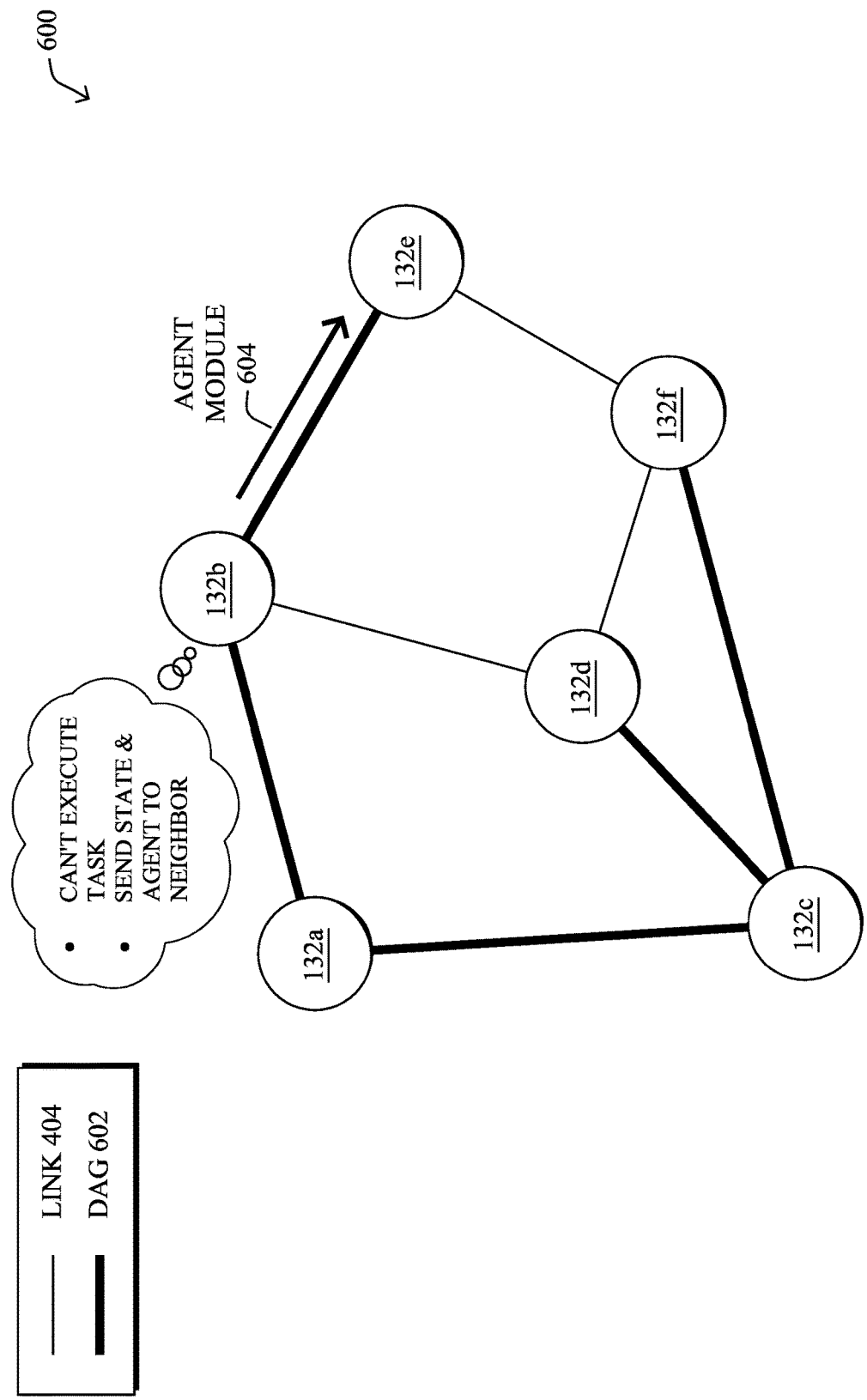
Figure 6C:
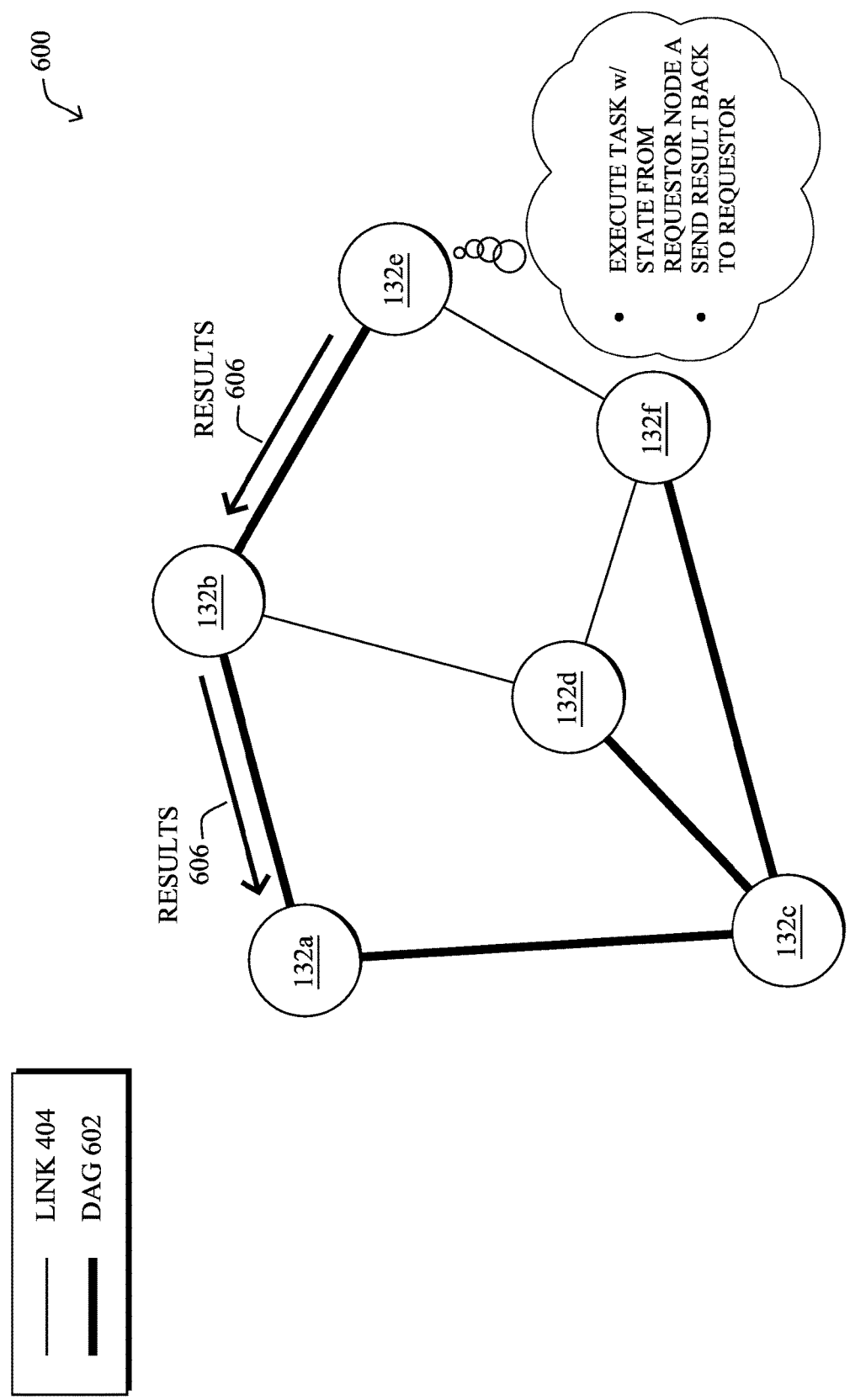

FIGS. 6A-6C illustrate an example of sending an agent to another network node for execution, according to various embodiments. As shown in FIG. 6A, assume that the nodes 132a-132f are part of a routing topology DAG 602, whereby links 404 have already been selected to form the paths in the network via which traffic is to be sent. Such a DAG 602 may be formed, for example, by employing RPL or another such protocol within the network.

As shown in FIG. 6A, assume that node 132a determines that it cannot execute a given computational task on its own. This may be due, for example, to a lack of a particular resource available on node 132a (e.g., CPU, battery reserves, etc.), or because the computation is of a type that can be partially offloaded through collaboration between node 132a and one or more other nodes 132 in the network. Assume, further, that node 132a is aware of its neighbors and their capabilities, through some neighbor discovery protocol. For example, the node 132 shown may use the Cisco Discovery Protocol (CDP), Link Layer Discovery Protocol (LLDP), or the like, to discover their neighbors and the capabilities of their neighbors Based on determining that node 132a is not able to perform a given computational task, it may package the state information required for this computation and the computational software/agent as part of an agent module 604. In turn, node 132a may sign agent module 604 and send it to a neighbor (e.g., node 132b) selected by node 132a.

In some embodiments, if the computation is to be ran locally, because it uses some local metric that could not be measured remotely, or would take too long to be transmitted there, the requester node 132a can add some execution constraint into its packaged request/agent module 604 (e.g., such as distance from the node). Then, not all neighbor are explored but only those which (cumulatively) comply with the constraints.

In another embodiment, the initial task could also be split into several atomic ones, and be executed on different nodes, so the process uses recursion on smaller items to determine the final results.

If node 132*b* can execute the agent, it may do so and send the results back to node 132*a*. However, as shown in FIG. 6B, if node 132*b* also determines that it cannot perform the computation for whatever reason, node 132*b* may send agent module 604 on to one or more of its own neighbors, such as node 132*e*. This walking process may repeat itself recursively until one or more suitable nodes receive the agent module 604.

As shown in FIG. 6C, assume now that node 132*e* has received agent module 604 and has the proper resources available to make the computation using the state information from node 132*a*. In turn, node 132*e* may execute the agent with the state information and return the computed results 406 back to node 132*a*. Since there is already a DAG/graph established in the network, the first node in the network that can do the job may send the result, which is then relayed back to the requestor. This way, only one node at a time is given the execution token. Results 406 can be, for example, packaged as another signed object and shipped back over a path that reverses the lookup described above (e.g., in a reverse direction along DAG 602).

In some embodiments, when a node is done exploring it neighbors with no luck, it may send a failure notification back to its own DAG parent, which can then try another neighbor of the parent, instead. If none of the nodes at all can execute the task, the requester will get failure from all of its neighbors and can declare general failure.

Thus, by leveraging the concept of a walker agent, a constrained node that cannot perform the entire computation locally can package the agent and state information for execution by one or more of its neighbors or other close by nodes in the network. For example, a set of IoT or other constrained devices may expose a set of application program interfaces (APIs) that a walker agent can use, e.g., to obtain a measurement, trigger an action, read a diagnostic, etc.

Figure 7:
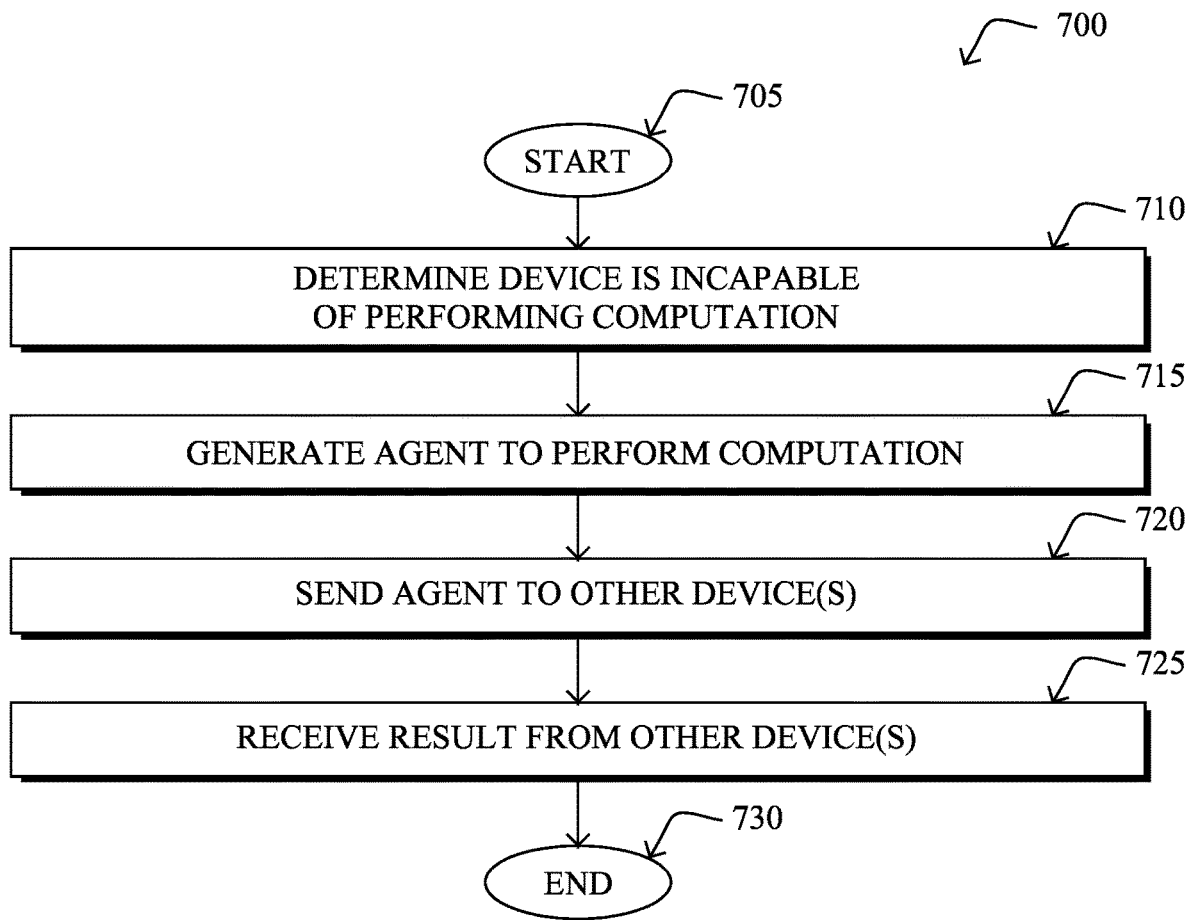
FIG. 7 illustrates an example simplified procedure for propagating a walker agent in a network according to device/node capabilities.

FIG. 7 illustrates an example simplified procedure for propagating a walker agent in a network according to device/node capabilities, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may determine that is incapable of performing a particular computation. In some embodiments, for example, the device may determine that it does not have sufficient resources to perform the computation (e.g., in terms of memory, processing power, available battery charge, etc.) or does not satisfy a policy associated with the computation (e.g., a security policy, a resource policy, etc.).

At step 715, as detailed above, the device may generate an executable walker agent configured to perform the particular computation. In some embodiments, the device may generate the agent to also include state information that can be used by the agent during execution to perform the computation. For example, the state information may comprise one or more measurements, statistics, or other parameters from the device. In another example, the state information may comprise the current parameter state of the computation, such as when the device has already started the computation but cannot finish.

At step 720, the device may send the executable agent to one or more other devices in the network, as described in greater detail above. In response to receiving the agent, the one or more other devices in the network may execute the agent to perform the particular computation and determine a result of the particular computation. In some embodiments, the other devices may also determine whether they themselves can execute the agent and, if not, may send the agent on towards further devices in the network. For example, if the device sends the agent to one of its neighbors for execution, and the neighbor is unable to execute the agent, the neighbor may pass the agent on to one of its own neighbors for execution. In some embodiments, the device may send the agent to the other device(s) with execution constraints that may be used by a receiving device to determine whether to execute the agent. For example, such constraints may be temporal (e.g., only execute the agent within a certain timeframe or if the result can be sent back to the device within a certain timeframe, etc.), locational (e.g., only execute the agent if the executing device is within a certain path distance to the device, etc.), capability-based (e.g., only execute the agent if the executing device has a predefined amount of resources available, etc.), combinations thereof, or the like.

At step 725, as detailed above, the device may receive a result of the computation from one or more of the other device(s) that execute the sent agent. Thus, while the device itself is incapable of performing the computation, the one or more other agents may perform the computation on its behalf and return the result back to the device. Note that doing so may be far more localized within the network than by leveraging a fog computing or cloud-based approach, which is of particular importance for time-sensitive computations. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Further, while procedures 500 and 700 are described separately, some or all of their respective steps may be integrated into one another, in further embodiments.

The techniques described herein, therefore, introduce various "walker" agents that may physically move between different executing nodes/devices within the network. In some aspects, a path computation walker agent may be used, allowing an optimal path to be computed without having to distribute the entire topology and metric information for the entire network. In further aspects, a walker agent may also move to more capable nodes in the network, if the current node does not have the resources to execute the agent.

While there have been shown and described illustrative embodiments that provide for deploying a walker agent within a network, it is to be understood that various other adaptations and modifications may be made within the spirit and scope of the embodiments herein. For example, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   determining, by a device in a network, that the device is incapable of performing a particular computation;
   generating, by the device, an executable agent configured to perform the particular computation;
   sending, by the device, the executable agent to one or more other devices in the network to be propagated within the network until the executable agent is received by the one or more other devices capable of executing the executable agent, wherein the one or more other devices in the network execute the executable agent to perform the particular computation and determine a result of the particular computation; and
   receiving, at the device, the result of the particular computation from at least one of the one or more other devices in the network that execute the executable agent.

2. The method as in claim 1, wherein determining that the device is incapable of performing the particular computation comprises:
   determining, by the device, that the device does not have sufficient resources available to perform the particular computation or does not satisfy a policy associated with the computation.

3. The method as in claim 1, wherein generating the executable agent configured to perform the particular computation comprises:
   including, by the device, state information with the executable agent for use when determining the result of the particular computation.

4. The method as in claim 1, wherein sending the executable agent to the one or more other devices in the network comprises:
   including, by the device, one or more execution constraints with the sent executable agent that control whether a given receiving device executes the executable agent.

5. The method as in claim 4, wherein the one or more execution constraints comprise at least one of: a time limit to return the result to the device or a path distance to the device.

6. The method as in claim 1, wherein sending the executable agent to the one or more other devices in the network comprises:
   sending, by the device, the executable agent to a neighbor of the device in the network for execution.

7. The method as in claim 6, wherein the neighbor of the device determines that it is incapable of executing the executable agent and propagates the executable agent within the network until the executable agent is received by a device capable of executing the executable agent.

8. The method as in claim 1, further comprising:
   splitting, by the device, the particular computation into a plurality of sub-computations;
   generating, by the device, a plurality of executable agents to perform the sub-computations; and
   sending, by the device, the plurality of executable agents to the one or more other devices in the network for execution.

9. An apparatus, comprising:
   one or more network interfaces to communicate with a network;
   a processor coupled to the network interfaces and configured to execute one or more processes; and
   a memory configured to store a process executable by the processor, the process when executed configured to:
      determine that the apparatus is incapable of performing a particular computation;
      generate an executable agent configured to perform the particular computation;
      send the executable agent to one or more other devices in the network to be propagated within the network until the executable agent is received by the one or more other devices capable of executing the executable agent, wherein the one or more other devices in the network execute the executable agent to perform the particular computation and determine a result of the particular computation; and
      receive the result of the particular computation from at least one of the one or more other devices in the network that execute the executable agent.

10. The apparatus as in claim 9, wherein the apparatus determines that the apparatus is incapable of performing the particular computation by:
    determining that the apparatus does not have sufficient resources available to perform the particular computation or does not satisfy a policy associated with the computation.

11. The apparatus as in claim 9, wherein the apparatus generates the executable agent configured to perform the particular computation by:
    including state information with the executable agent for use when determining the result of the particular computation.

12. The apparatus as in claim 9, wherein the apparatus sends the executable agent to the one or more other devices in the network by:
    including one or more execution constraints with the sent executable agent that control whether a given receiving device executes the executable agent.

13. The apparatus as in claim 12, wherein the one or more execution constraints comprise at least one of: a time limit to return the result to the apparatus or a path distance to the apparatus.

14. The apparatus as in claim 9, wherein the apparatus sends the executable agent to the one or more other devices in the network by:
    sending the executable agent to a neighbor of the apparatus in the network for execution.

15. The apparatus as in claim 9, wherein the neighbor of the apparatus determines that it is incapable of executing the executable agent and propagates the executable agent within the network until the executable agent is received by a device capable of executing the executable agent.

16. The apparatus as in claim 9, wherein the process when executed is further configured to:
- split the particular computation into a plurality of sub-computations;
- generate a plurality of executable agents to perform the sub-computations; and
- send the plurality of executable agents to the one or more other devices in the network for execution.

17. A non-transitory, computer-readable medium storing program instructions that, when executed by a device in a network to perform a process comprising:
- determining, by the device in the network, that the device is incapable of performing a particular computation;
- generating, by the device, an executable agent configured to perform the particular computation;
- sending, by the device, the executable agent to one or more other devices in the network to be propagated within the network until the executable agent is received by the one or more other devices capable of executing the executable agent, wherein the one or more other devices in the network execute the executable agent to perform the particular computation and determine a result of the particular computation; and
- receiving, at the device, the result of the particular computation from at least one of the one or more other devices in the network that execute the executable agent.

18. The non-transitory computer readable medium as in claim 17, wherein sending the executable agent to the one or more other devices in the network comprises:
- including, by the device, one or more execution constraints with the sent executable agent that control whether a given receiving device executes the executable agent.

19. The non-transitory computer readable medium as in claim 17, wherein generating the executable agent configured to perform the particular computation comprises:
- including, by the device, state information with the executable agent for use when determining the result of the particular computation.

20. The non-transitory computer-readable medium as in claim 17, wherein sending the executable agent to the one or more other devices in the network comprises:
- including, by the device, one or more execution constraints with the sent executable agent that control whether a given receiving device executes the executable agent.

* * * * *